United States Patent [19]

Sakamoto et al.

[11] Patent Number: 5,391,588

[45] Date of Patent: Feb. 21, 1995

[54] CURABLE ORGANOPOLYSILOXANE COMPOSITIONS

[75] Inventors: Takafumi Sakamoto; Masatoshi Arai, both of Annaka, Japan; Kazutoshi Fujioka, Pittsburgh, Pa.

[73] Assignee: Shin-Etsu Chemical Co., Ltd., Tokyo, Japan

[21] Appl. No.: 166,077

[22] Filed: Dec. 14, 1993

[30] Foreign Application Priority Data

Dec. 14, 1992 [JP] Japan .................. 4-353582

[51] Int. Cl.⁶ .............................. C08F 2/46
[52] U.S. Cl. ........................ 522/99; 528/34; 528/18
[58] Field of Search ................ 522/99; 528/34, 18

[56] References Cited

U.S. PATENT DOCUMENTS

| | | | |
|---|---|---|---|
| 4,699,802 | 10/1987 | Nakos et al. | 528/34 |
| 4,943,613 | 7/1990 | Arai et al. | 522/99 |
| 5,180,771 | 1/1993 | Arai et al. | 528/34 |
| 5,268,396 | 12/1993 | Lai | 522/99 |
| 5,292,849 | 4/1994 | Fujioka et al. | 528/34 |

Primary Examiner—John C. Bleutge
Assistant Examiner—Karen A. Dean
Attorney, Agent, or Firm—Oblon, Spivak, McClelland, Maier & Neustadt

[57] ABSTRACT

Curable compositions comprising (A) an organopolysiloxane of the following general formula (1):

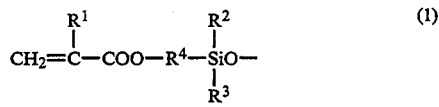

wherein $R^1$ is hydrogen or methyl, $R^2$ and $R^3$ are monovalent hydrocarbon groups, and $R^4$ is a divalent organic group, (B) a silane having an α-silylester group, (C) a photoinitiator, and (D) a curing catalyst. The compositions are both photo-curable and room-temperature-curable. When cured by irradiation with light, the compositions give cured products having good rubber properties.

9 Claims, No Drawings

CURABLE ORGANOPOLYSILOXANE COMPOSITIONS

BACKGROUND OF THE INVENTION

1. Field of the Invention

The present invention relates to curable organopolysiloxane compositions which are both photo-curable and room-temperature-curable.

2. Description of the Prior Art

It is well known that organopolysiloxanes, when heated in the presence of an organic peroxide, become elastic silicone rubber products which are excellent in heat resistance, cold resistance, weatherability and electrical properties. Among such organopolysiloxanes are those which are curable by irradiation with light in the presence of a photoinitiator.

For instance, Japanese Patent Publication (KOKOKU) 52-40334 (1977) and Japanese Pre-examination Patent Publication (KOKAI) 60-104158 (1985) disclose ultraviolet (UV)-curable type organopolysiloxane compositions which comprise a vinyl group-containing polysiloxane and a mercapto group-containing polysiloxane and which give cured products through photo radical addition reactions.

Also, Japanese Patent Publication (KOKOKU) 53-36515 (1978) and Japanese Pre-examination Patent Publication (KOKAI) 60-215009 (1985) disclose photo-curable type organopolysiloxane compositions which comprise an acryloxy group ($-OCOCH=CH_2$) containing polysiloxane and a sensitizer and which give cured products when irradiated with light.

However, the above-mentioned compositions containing a vinyl group-containing polysiloxane and a mercapto group-containing polysiloxane have the problems of odor and metal-corroding property both ascribable to the mercapto group, and are thereby limited in application.

On the other hand, the above-mentioned compositions comprising an acryloxy group-containing polysiloxane and a sensitizer have the problem that, in order to obtain rubber-like elastic products, the acryloxy group-containing polysiloxane must be or comprise a linear polysiloxane with a high molecular weight. When such polysiloxane is used, the amount of acryloxy groups located at terminal ends is very small on a relative basis, leading to a lowered curability. In addition, these compositions have the drawback that their surface portions exposed to air are hardly cured, because of inhibition by oxygen. Of this type of compositions, therefore, only those containing a polysiloxane with a relatively high acryloxy group content and intended to form resinous cured products have been put to practical use; those for giving rubber-like elastic products have not yet been put to practical use.

Besides, although the photo-curable organopolysiloxane compositions as above mentioned are capable of speedy curing by irradiation with UV rays and are advantageous over conventional condensation type, heat-curable type and platinum-catalyzed addition reaction type organopolysiloxane compositions with respect to workability, the elastic silicone rubber products resulting from the photo-curable compositions are inferior in tensile strength. Further, the photo-curable compositions lack in storage stability. Thus, there are restrictions on the application of the photo-curable organopolysiloxane compositions.

SUMMARY OF THE INVENTION

It is accordingly an object of the present invention to provide a curable organopolysiloxane composition which overcomes the above-mentioned drawbacks of the photo-curable organopolysiloxane compositions according to the prior art, is curable by irradiation with UV light and which can form a cured product having excellent rubber properties.

According to the present invention, there is provided a curable organopolysiloxane composition comprising:

(A) 100 parts by weight of an organopolysiloxane which has at least one group of the following general formula (1):

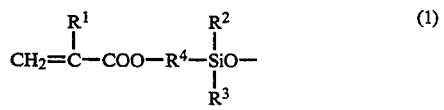

wherein $R^1$ is a hydrogen atom or a methyl group, $R^2$ and $R^3$ may be identical or different from each other and are each an unsubstituted or substituted monovalent hydrocarbon group, and $R^4$ is a divalent organic group, per molecule, (B) from 0.1 to 10 parts by weight of an organosilicon compound in which a group of the following general formula (2):

wherein $R^5$ to $R^7$ may be identical or different from each other and are each a hydrogen atom or an unsubstituted or substituted monovalent hydrocarbon group, is bonded directly to a silicon atom, (C) from 0.01 to 10 parts by weight of a photoinitiator, and (D) from 0.01 to 10 parts by weight of a curing catalyst.

The composition according to the present invention has both photo-curable property and room-temperature-curable property, and is capable of forming, upon photo-cure, a cured product excellent in rubber properties.

DETAILED DESCRIPTION OF PREFERRED EMBODIMENTS

(A) Organopolysiloxane

In the present invention, the organopolysiloxane of component (A) has a (meth)acryloxyorganosilyl group of the above general formula (1) in its molecule, particularly at a terminal end of its molecular chain, which enables both curing by irradiation with light (photo-curing) and curing by condensation subsequent to hydrolysis.

In the above general formula (1), the monovalent hydrocarbon groups $R^2$ and $R^3$ include, for example, those having from 1 to 10 carbon atoms, preferably from 1 to 8 carbon atoms. Specific examples include alkyl groups such as methyl, ethyl, propyl, butyl and the like; alkenyl groups such as vinyl, allyl and the like; aryl groups such as phenyl, tolyl and the like; aralkyl groups such as benzyl, 2-phenyl and the like; and groups derived from these groups by substitution of part or all of their hydrogen atoms with a halogen atom or the like, such as chloromethyl, 3,3,3-trifluoropropyl and the like.

The divalent organic group $R^4$ includes, for example, alkylene groups of from 1 to 3 carbon atoms, among which particularly preferred is the methylene group.

In the present invention, the organopolysiloxane containing at least one (meth)acryloxyorganosilyl group in its molecule as above described may be in a resinous state or in an oily state, and includes, for example, organopolysiloxanes having the following general formula (3):

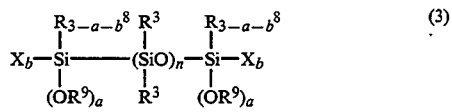

wherein X is a (meth)acryloxyorganosilyl group of the above general formula (1), $R^8$ is an unsubstituted or substituted monovalent hydrocarbon group, $R^9$ is an alkyl group, a is an integer from 0 to 2, and b is an integer from 1 to 3, provided the sum of a and b is not more than 3.

In the above general formula (3), the monovalent hydrocarbon group $R^8$ includes, for example, those having from 1 to 10 carbon atoms, preferably from 1 to 8 carbon atoms. Specific examples of $R^8$ include the groups set forth above as exemplars of $R^2$ and $R^3$, and the like groups. Examples of $R^9$ include lower alkyl groups of up to 4 carbon atoms, among which particularly preferred is methyl.

Preferable, but not limitative, examples of the organopolysiloxane for use as the above-described component (A) include the compounds of the following formulas, in which n is a positive integer, and Me, Et and Ph stand for the methyl, the ethyl and the phenyl group, respectively.

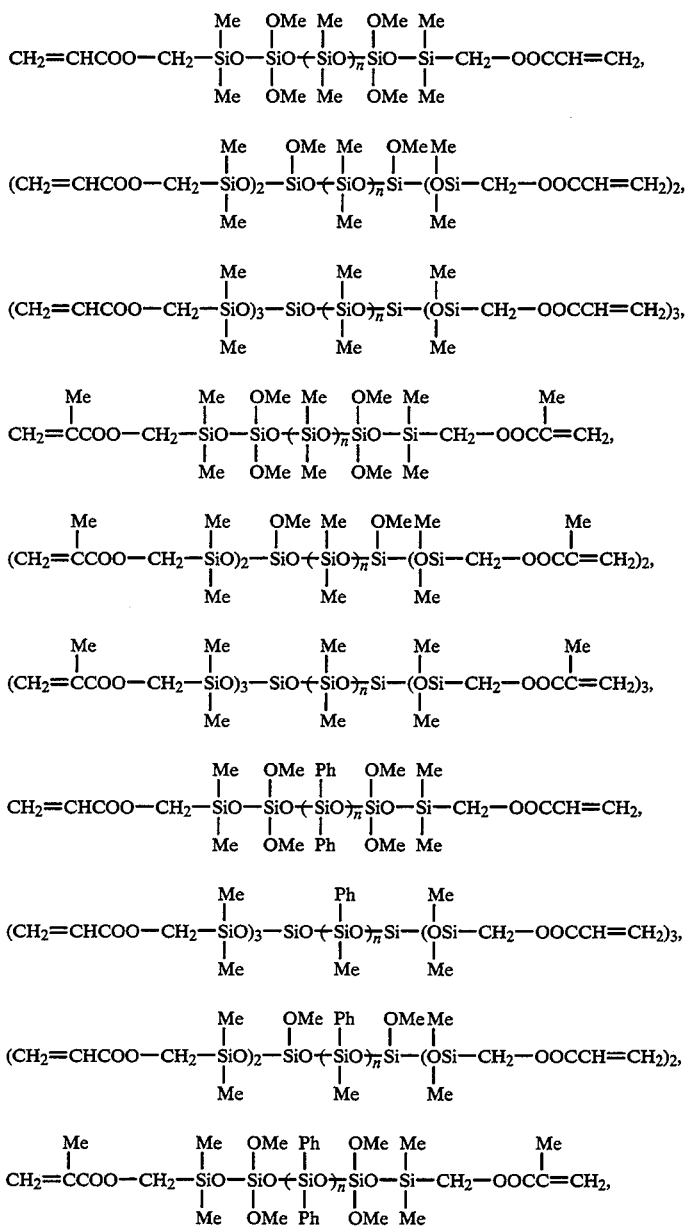

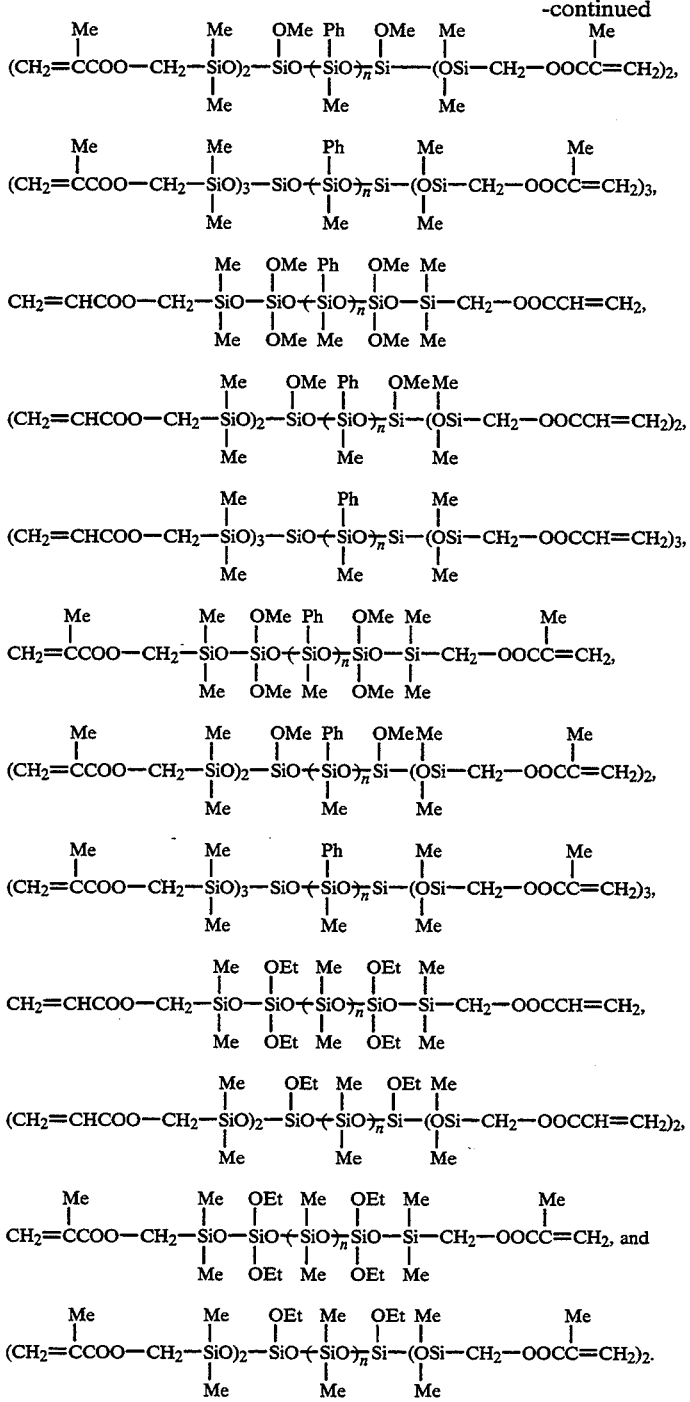

Among these organopolysiloxanes, particularly preferred in the present invention are those having an alkoxyl group.

Besides, these organopolysiloxanes can be obtained, for example, by bringing a diorganopolysiloxane terminated with an alkoxysilyl group and a (meth)acryloxyorganosilanol into reaction in the presence of a catalyst such as dioctyltin or the like.

(B) Organosilicon Compound

In the present invention, the organosilicon compound of component (B) is one in which a group of the above general formula (2) is bonded to a silicon atom. The compounds in which such group is attached to a silicon atom are called α-silylester compounds, and are peculiar compounds in that the Si—C bond can be cleaved under relatively mild conditions to react with alcohol. By utilizing this property of the a-silylester compound, the present invention offers the advantage, for example, of removing the cause of poor preservability of dealcoholation type condensation-curable RTV compositions (the presence of alcohol left in the system).

In the general formula (2), $R^5$ and $R^6$ are each preferably a hydrogen atom or a lower alkyl group of up to 2 carbon atoms, and $R^7$ is preferably an alkyl group of from 1 to 8 carbon atoms or a phenyl group.

Suitable examples of the organosilicon compound as above include the silane compounds of the following general formula (4):

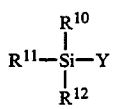 (4)

wherein Y is a group of the above general formula (2), $R^{10}$ to $R^{12}$ may be identical or different from each other and are each a group selected from the group consisting of alkoxyl, alkyl, vinyl and phenyl groups and hydrogen atoms. Specific examples include the silane compounds of the following formulas, in which Me, Et, Bu and Ph stand for the methyl, the ethyl, the butyl and the phenyl group, respectively.

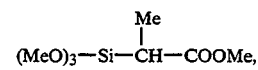

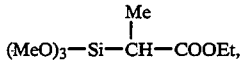

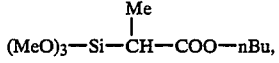

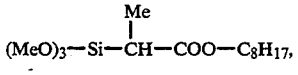

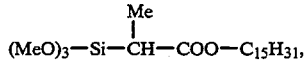

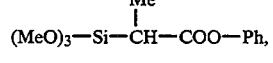

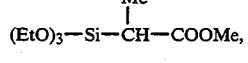

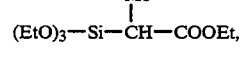

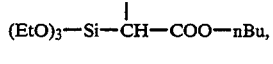

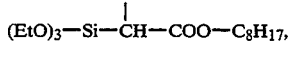

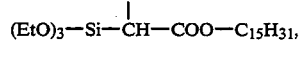

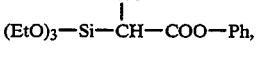

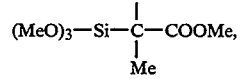

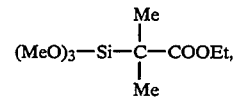

-continued

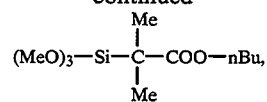

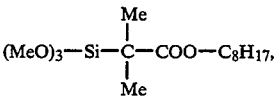

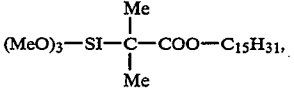

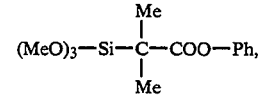

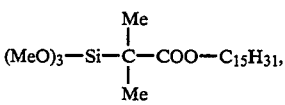

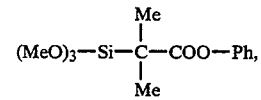

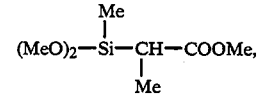

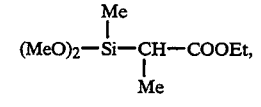

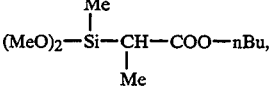

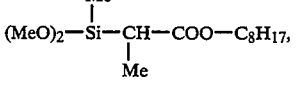

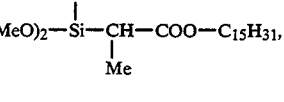

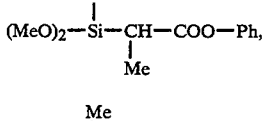

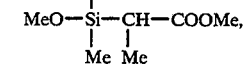

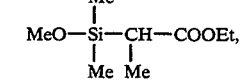

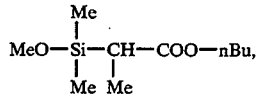

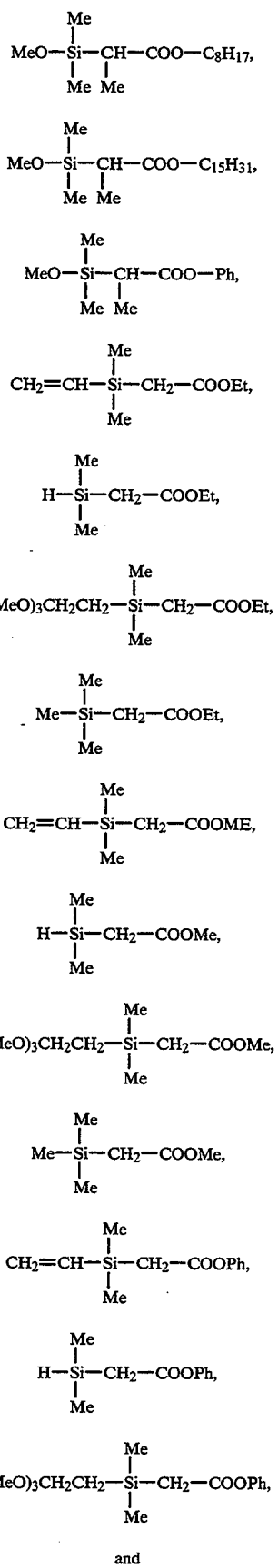

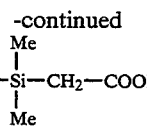

and

Among these silane compounds, particularly preferred as the component (B) in the present invention are those having an alkoxyl group.

The organosilicon compound of the component (B) as above described is used in an amount of from 0.1 to 10 parts by weight, preferably from 0.5 to 5 parts by weight, per 100 parts by weight of the component (A). If the amount of component (B) is less than 0.1 part by weight, the curing properties of the composition after photo-curing are impaired, so that cured products with good rubber properties cannot be obtained. If the amount exceeds 10 parts by weight, on the other hand, the photo-curing property of the composition may become unsatisfactory or the rubber physical properties of cured products may be impaired.

(C) Photoinitiator

The photoinitiator of component (C) is for promoting the photo-polymerization of acryloxy groups in the organopolysiloxane of component (A). As the photoinitiator, those known in the art can be used, for example, acetophenone, propiophenone, benzophenone, xanthol, fluorenone, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl) ketone, benzil dimethyl ketal, 2-chlorothioxanthone, diethylacetophenone, 1-hydroxycyclohexyl phenyl ketone, 2-methyl-[4-(methylthio)-phenyl]-2-morpholino-1-propane, 2,2-dimethoxy-2-phenylacetophenone, diethoxyacetophenone, and the like.

The photoinitiator is used in an amount of from 0.01 to 10 parts by weight, preferably from 0.1 to 5 parts by weight, per 100 parts by weight of the component (A). If the amount of the photoinitiator added is less than 0.01 part by weight, the addition produces no effect, whereas if the amount exceeds 10 parts by weight, the cured silicone rubber product has poor physical properties, particularly, low strength.

(D) Curing Catalyst

The component (D) is used for promoting the curing effected under the action of the organosilicon compound of component (B). Curing catalysts similar to those used in silicone resin compositions which are curable in the presence of moisture, for example, can be used as component (D). Specifically, tin catalysts, titanium catalysts and the like can be used. The tin catalysts include, for example, tin naphthenate, tin caprylate, dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, dibutyltin benzyl maleate, and the like. The titanium catalysts include, for example, titanic acid esters and titanium chelate compounds, such as tetraisopropoxytitanium, tetra-n-butoxytitanium, tetrabis(2-ethylhexoxy)titanium, dipropoxybis(acetylacetonato)titanium, titanium isopropoxyoctylene glycol, and the like.

The curing catalyst may be used in a so-called catalytic amount, which is, for example, from 0.01 to 10 parts by weight, preferably from 0.1 to 5 parts by weight, per 100 parts by weight of the component (A).

Other Compounding Ingredients

In the curable composition of the present invention, besides the components (A) to (D) as above-described, various additives which are known per se can be incorporated in such ranges as not to impair the curing properties of the composition. For example, in order to enhance mechanical properties of elastic silicone rubber products obtained on curing the composition, fumed-silica fillers which do not hinder photo-curing can be added, as required. Further, thixotropy-imparting agents, heat resistance improving agents, coloring agents and the like can also be added to the composition, in order to controlling the physical properties of the composition.

The curable composition of the present invention can be obtained by mixing uniformly the above-described components, together with the optional compounding ingredients, as required. When irradiated with UV rays, the composition is readily cured in a short time of from 1 to 20 seconds to be a silicone rubber. The cured composition, or silicone rubber, is further cured in the presence of moisture in the atmosphere, whereby rubber properties are enhanced.

The compositions according to the present invention as described above are both photo-curable and room-temperature-curable, and can give rubberlike elastic cured products excellent in rubber properties such as tensile strength, etc. Furthermore, the compositions have excellent storage stability. Thus, the compositions of the present invention are of great use for such applications as sealing material, coating material, potting material, and so forth.

EXAMPLES

In the following examples, "part(s)" means "part(s) by weight" and viscosity is given in values measured at 25° C.

Synthesis Example 1

A 1-liter round bottom flask equipped with a thermometer, cooling pipe, dropping funnel and stirrer was charged with 500 g of a trimethoxysilyl-terminated dimethylpolysiloxane (OMe groups: 0.009 mol/100 g) having the following formula:

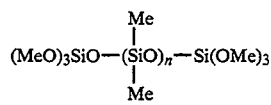

(wherein n is a positive integer) with a viscosity of 1,300 cSt and 7.2 g of acryloxymethyl-silanol, followed by mixing. To the mixture was added 0.50 g (1,000 ppm based on the dimethylpolysiloxane) of dioctyltin, and reaction was carried out with stirring at room temperature for 24 hours. After the reaction was over, methanol as by-product was removed by stripping under the conditions of 40° C. and 20 mmHg, leaving a colorless transparent liquid having a viscosity of 1,500 cSt. The liquid product thus obtained was identified by IR spectrum as a polymer having the structure of the following formula:

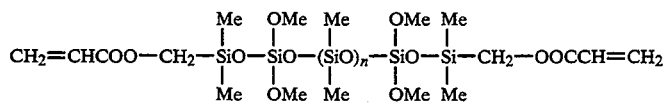

(wherein n is a positive integer). The polymer is hereinafter referred to as Polysiloxane (1).

Synthesis Example 2

In the same manner as in Synthesis Example 1,500 g of the same trimethoxysilyl-terminated dimethylpolysiloxane as used in Synthesis Example 1, 14.4 g of acryloxymethylsilanol and 0.50 g of dioctyltin were mixed and brought to reaction under stirring at room temperature for 48 hours. After the reaction was over, by-produced methanol was removed by stripping under the conditions of 40° C. and 20 mmHg, whereby a colorless transparent liquid with a viscosity of 1,200 cSt was obtained. The liquid product was identified by IR spectrum as a polymer having the structure of the formula given below. The polymer is hereinafter referred to as Polysiloxane (2).

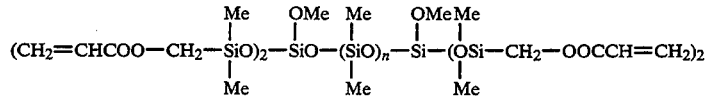

Example 1

Polysiloxane (1) in an amount of 100 parts and Polysiloxane (2) in an amount of 100 parts were each admixed uniformly with 2 parts of diethoxyacetophenone (photoinitiator), 3 parts of ethyl 2-trimethoxysilylpropionate (hereinafter referred to simply as alkoxysilane) and 0.5 part of dibutyltin dioctoate, to prepare a siloxane composition (a) and a siloxane composition (b), respectively.

Also, 100 parts of Polysiloxane (1) was admixed uniformly with 2 parts of the photoinitiator, 3 parts of the alkoxysilane, 0.5 part of dibutyltin dioctoate and 10 parts of a fumed silica, as reinforcing filler, whose surfaces had been treated with hexamethyldisilazane and which had a specific surface area of 130 m$^2$/g (hereinafter referred to simply as silica), to prepare a siloxane composition (c).

These siloxane compositions were irradiated with UV rays three times by using a ultraviolet ray irradiation apparatus ASE-20 (trade name; a product by Nippon Denchi K.K.) at a moving speed of 1 m/min., to be thereby cured (UV curing). After the lapse of 30 minutes from the curing, rubber physical properties of the cured products were measured according to JIS K 6301 (Hardness measurement was carried out on a Type A spring hardness tester according to JIS K 6301.).

Besides, cured products obtained by subjecting the siloxane compositions to the UV curing and then to a curing carried out under the conditions of 20°±3° C. and 55±5% RH for 7 days (RTV curing) were also measured for rubber physical properties in the same manner as above.

Furthermore, cured products obtained by subjecting the siloxane compositions to only the RTV curing, without UV curing, were also measured for rubber physical properties in the same manner as above.

Moreover, the cured products obtained as above were measured for rubber properties after stored at 70° C. for 7 days.

The results of the above measurements are set forth in Table 1.

TABLE 1

| Constituents (parts): | Composition (a) | | | Composition (b) | | | Composition (c) | | |
| --- | --- | --- | --- | --- | --- | --- | --- | --- | --- |
| Polysiloxane (1) | 100 | | | — | | | 100 | | |
| Polysiloxane (2) | — | | | 100 | | | — | | |
| Photoinitiator | 2 | | | 2 | | | 2 | | |
| Alkoxysilane | 3 | | | 3 | | | 3 | | |
| Dibutyltin dioctoate | 0.5 | | | 0.5 | | | 0.5 | | |
| Silica | — | | | — | | | 10 | | |
| Curing conditions Physical properties: | UV | UV + RTV | RTV | UV | UV + RTV | RTV | UV | UV + RTV | RTV |
| Initial: | | | | | | | | | |
| Hardness | 22 | 36 | 18 | 44 | 45 | 12 | 30 | 42 | 21 |
| Elongation (%) | 150 | 90 | 140 | 60 | 60 | 160 | 180 | 170 | 190 |
| Tensile strength (kgf/cm$^2$) | 4.4 | 7.8 | 4.1 | 8 | 8 | 1.5 | 18 | 24 | 10 |
| After storage: | | | | | | | | | |
| Hardness | 23 | 40 | 17 | 44 | 46 | 11 | 29 | 44 | 22 |
| Elongation (%) | 150 | 80 | 150 | 70 | 60 | 170 | 170 | 160 | 190 |
| Tensile strength (kgf/cm$^2$) | 3.8 | 8 | 4 | 7.6 | 7.8 | 1.4 | 17 | 26 | 11 |

Comparative Example 1

Siloxane compositions (d) and (e) were prepared by using Polysiloxane (1) according to the formulations given in Table 2 below.

In the same manner as in Example 1, these compositions were cured under various curing conditions and the resulting cured products were measured for physical properties. The results are given in Table 2.

TABLE 2

| Constituents (parts): | Composition (d) | | | Composition (e) | | |
| --- | --- | --- | --- | --- | --- | --- |
| Polysiloxane (1) | 100 | | | 100 | | |
| Polysiloxane (2) | — | | | — | | |
| Photoinitiator | 2 | | | 2 | | |
| Alkoxysilane | — | | | — | | |
| Dibutyltin dioctoate | 0.5 | | | 0.5 | | |
| Silica | — | | | 10 | | |
| Curing conditions Physical properties | UV | UV + RTV | RTV | UV | UV + RTV | RTV |
| Initial: | | | | | | |
| Hardness | 20 | 30 | 15 | 28 | 38 | 20 |
| Elongation (%) | 160 | 100 | 150 | 150 | 140 | 170 |
| Tensile strength (kgf/cm$^2$) | 4.0 | 5.1 | 2.0 | 10 | 18 | 5 |
| After storage: | | gelled | | | gelled | |

Example 2

Siloxane compositions (f), (g) and (h) were prepared in the same manner as in Example 1 except that 2-ethylhexyl 2-trimethoxysilylpropionate in place of ethyl 2-trimethoxysilylpropionate. With respect to these compositions, formation of cured products and measurements of rubber physical properties were carried out in the same manner as in Example 1. The results are given in Table 3.

TABLE 3

| Constituents (parts): | Composition (f) | | | Composition (g) | | | Composition (h) | | |
| --- | --- | --- | --- | --- | --- | --- | --- | --- | --- |
| Polysiloxane (1) | 100 | | | — | | | 100 | | |
| Polysiloxane (2) | — | | | 100 | | | — | | |
| Photoinitiator | 2 | | | 2 | | | 2 | | |
| Alkoxysilane* | 3 | | | 3 | | | 3 | | |
| Dibutyltin dioctoate | 0.5 | | | 0.5 | | | 0.5 | | |
| Silica | — | | | — | | | 10 | | |
| Curing conditions Physical properties: | UV | UV + RTV | RTV | UV | UV + RTV | RTV | UV | UV + RTV | RTV |

TABLE 3-continued

| | | | | | | | | | |
|---|---|---|---|---|---|---|---|---|---|
| Initial: | | | | | | | | | |
| Hardness | 23 | 35 | 14 | 42 | 43 | 8 | 28 | 40 | 18 |
| Elongation (%) | 160 | 100 | 120 | 70 | 70 | 200 | 150 | 190 | 210 |
| Tensile strength (kgf/cm$^2$) | 3.8 | 6.9 | 3.6 | 7 | 7 | 1.7 | 17 | 22 | 9 |
| After storage: | | | | | | | | | |
| Hardness | 22 | 37 | 15 | 43 | 44 | 9 | 29 | 39 | 17 |
| Elongation (%) | 170 | 120 | 170 | 60 | 60 | 190 | 170 | 180 | 200 |
| Tensile strength (kgf/cm$^2$) | 3.9 | 7.2 | 3.8 | 7 | 8 | 1.6 | 14 | 21 | 9 |

*Alkoxysilane used here is 2-ethylhexyl 2-trimethoxysilylpropionate.

We claim:

1. A curable organopolysiloxane composition comprising:

(A) 100 parts by weight of an organopolysiloxane which has at least one group of the following general formula (1):

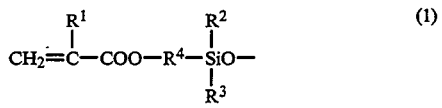

wherein $R^1$ is a hydrogen atom or a methyl group, $R^2$ and $R^3$ may be identical or different from each other and are each an unsubstituted or substituted monovalent hydrocarbon group, and $R^4$ is a divalent organic group, per molecule, (B) from 0.1 to 10 parts by weight of an organosilicon compound in which a group of the following general formula (2):

wherein $R^5$ to $R^7$ may be identical or different from each other and are each a hydrogen atom or an unsubstituted or substituted monovalent hydrocarbon group, is bonded directly to a silicon atom, (C) from 0.01 to 10 parts by weight of a photoinitiator, and (D) from 0.01 to 10 parts by weight of a curing catalyst.

2. The composition of claim 1, wherein in the above general formula (1), $R^2$ and $R^3$ are each a monovalent hydrocarbon group having from 1 to 10 carbon atoms, and $R^4$ is an alkylene group having from 1 to 3 carbon atoms.

3. The composition of claim 1, wherein the component (A) comprises an organopolysiloxane of the following general formula (3):

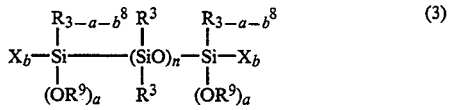

wherein X is a group of the above general formula (1), $R^8$ is an unsubstituted or substituted monovalent hydrocarbon group, $R^9$ is an alkyl group, a is an integer from 0 to 2, and b is an integer from 1 to 3, provided the sum of a and b is not more than 3 and n is a positive integer.

4. The composition of claim 3, wherein in the above general formula (3), $R^8$ is a monovalent hydrocarbon group having from 1 to 10 carbon atoms, and $R^9$ is a lower alkyl group having up to 4 carbon atoms.

5. The composition of claim 4, wherein $R^4$ in the above general formula (1) is a methylene group.

6. The composition of claim 1, wherein in the above general formula (2), $R^5$ and $R^6$ are each a hydrogen atom or an alkyl group having up to 2 carbon atoms, and $R^7$ is an alkyl group having from 1 to 8 carbon atoms or a phenyl group.

7. The composition of claim 1, wherein the component (B) comprises a silane compound of the following general formula (4):

wherein Y is a group of the above general formula (2), $R^{10}$ to $R^{12}$ may be identical or different from each other and are each a group selected from the group consisting of alkoxyl, alkyl, vinyl and phenyl groups and hydrogen atoms.

8. The composition of claim 7, wherein said silane compound has an alkoxyl group.

9. A cured product obtained by curing the composition as claimed in claim 1.

* * * * *